United States Patent
Van Der Pijl et al.

(10) Patent No.: US 9,130,479 B2
(45) Date of Patent: Sep. 8, 2015

(54) ADAPTIVE CONTROL METHOD AND ADAPTIVE CONTROLLER FOR CONTROLLING ENERGY SUPPLIED TO A RESONANT TANK

(75) Inventors: Fredrik Frank Arie Van Der Pijl, Amsterdam (NL); Jan Abraham Ferreira, The Hague (NL); Pavol Bauer, Delft (NL); Miguel Castilla, El Prat de Llobregat (ES)

(73) Assignee: Optimos Apto B.V., Rotterdam (NL)

( * ) Notice: Subject to any disclaimer, the term of this patent is extended or adjusted under 35 U.S.C. 154(b) by 685 days.

(21) Appl. No.: 13/394,829

(22) PCT Filed: Sep. 8, 2010

(86) PCT No.: PCT/NL2010/050570
§ 371 (c)(1),
(2), (4) Date: Jun. 15, 2012

(87) PCT Pub. No.: WO2011/031143
PCT Pub. Date: Mar. 17, 2011

(65) Prior Publication Data
US 2012/0326519 A1     Dec. 27, 2012

(30) Foreign Application Priority Data
Sep. 8, 2009   (NL) .................................... 2003450

(51) Int. Cl.
*H02M 7/00*   (2006.01)
*H02M 7/5387*  (2007.01)
*H02J 5/00*   (2006.01)
*H02M 7/48*   (2007.01)

(52) U.S. Cl.
CPC ........... *H02M 7/53871* (2013.01); *H02J 5/005* (2013.01); *H02M 2007/4815* (2013.01); *Y02B 70/1441* (2013.01)

(58) Field of Classification Search
CPC ...... H02J 5/005; H02M 7/48; H02M 7/53871
USPC ........................................... 307/104
See application file for complete search history.

(56) References Cited

PUBLICATIONS

Kim, Marn-Go and Youn, Myung-Joong, "An Energy Feedback Control of Series Resonant Converter," Jul. 1991, IEEE, IEEE Transactions on Power Electronics, vol. 6 Issue 3, pp. 338-345.*
Schutz, J. et al. "Load Adaptive Medium Frequency Resonant Power Supply," 2002, IEEE, IECON 02 [Industrial Electronics Society, IEEE 2002 28th Annual Conference of the] vol. 1, pp. 282-287.*
PCT/NL2010/050570 International Search Report. Oct. 20, 2010.
Van Der Pijl F F A et al: "Quantum Control for an Experimental Contact less Energy Transfer System for Multiple Users" Power Electronics Specialists Conference, 2007. PESC 2007. IEEE, IEEE, Piscataway, NJ, USA, Jun. 17, 2007, pp. 343-349, XP031218313, ISBN: 978-1-4244-0654-8.

(Continued)

*Primary Examiner* — Jared Fureman
*Assistant Examiner* — Brett Squires
(74) *Attorney, Agent, or Firm* — Banner & Witcoff, Ltd.

(57) ABSTRACT

The invention relates to an adaptive controlling method for controlling energy supplied by an electrical source to a resonance tank that is connectable to an electric load. The method comprises the step of determining an energy amount to be supplied to the tank, based on information of energy in the resonance tank.

16 Claims, 5 Drawing Sheets

(56) References Cited

PUBLICATIONS

Fredrik F A Van Der Pijl et al: "Design of an Inductive Contactless Power System for Multiple Users" The 2006 IEEE Industry Applications Conference Forty-First IAS Annual Meeting, Conference Record of, IEEE, Piscataway, NJ, US, Oct. 1, 2006, pp. 1876-1883, XP031026279 ISBN: 978-1-4244-0364-6.

Fredrik F A Van Der Pijl et al: "Implementation of an adaptive sliding-mode contol for a quantum series-resonant converter" Power Electronics and Applications 2009. EPE '09 13th European Confer ence on, IEEE, Piscataway, NJ, USA, Sep. 8, 2009, pp. 1-10, XP031541387 ISBN: 978-1-4244-4432-8.

Castilla M et al: "Dynamic response optimization of quantum series-parallel resonant converters using sliding mode control" Power Electronics Specialists Conference, 2000. PESC 00. 2000 IEEE 31S T Annual Jun. 18-23, 2000, Piscataway, NJ, USA,IEEE, vol. 2. Jun. 18, 2000, pp. 702-707, XP010518744 ISBN: 978-0-7803-5692-4.

Castilla M et al: "A Comparative Study of Sliding-Mode Control Schemes for Quantum Series Resonant Inverters" IEEE Transactions on Industrial Electronics, IEEE Service Center, Piscataway, NJ, USA, vol. 52, No. 9, Sep. 1, 2009, pp. 3487-3495, XP011268832 ISSN: 0278-0046.

* cited by examiner

ADAPTIVE CONTROL METHOD AND ADAPTIVE CONTROLLER FOR CONTROLLING ENERGY SUPPLIED TO A RESONANT TANK

CROSS-REFERENCE TO RELATED APPLICATIONS

This application is a U.S. National Stage application under 35 U.S.C. §371 of International Application PCT/NL2010/050570 (published as WO 2011/031143 A1), filed Sep. 8, 2010, which claims priority to Application NL 2003450, filed Sep. 8, 2009. Benefit of the filing date of each of these prior applications is hereby claimed. Each of these prior applications is hereby incorporated by reference in its entirety.

The invention relates to an adaptive controlling method for controlling energy supplied by an electrical source to a resonance tank connectable to an electric load.

A resonant tank includes at least one inductance and at least one capacitance so that electrical energy can be stored in the tank. In certain applications a resonance tank can be used as an intermediate electrical energy reservoir that is fed by a particular electrical source and that might be loaded by a varying electrical load.

Since the signal behavior of the electrical source and a desired electrical behavior at the electrical load side typically do not coincide with the electrical signals in the resonant tank, an input converter and an output converter is interconnected between the resonant tank on one side, and the source and the load on the other side, respectively. The converter is arranged for transforming the frequency of the signal as well as controlling a desired amplitude at the load, so that an electrical load such as a domestic appliance may function properly. Thereto, in prior art systems, a voltage at the load is controlled, so that a variety of load impedances can be coupled to the resonance tank while maintaining voltage requirements.

It is an object of the invention to improve an adaptive controlling method for controlling energy supplied by an electrical source to a resonance tank connectable to an electric load. Thereto, the method according to the invention further comprises the step of determining an energy amount to be supplied based on information of energy in the resonance tank.

The invention is at least partially based on the insight that voltage controlled converters are not optimal from an energetic point of view. An accurate study of such a system reveals that in general more energy is supplied to the resonance tank than is needed in a particular situation, thereby causing more copper losses in the tank than would be necessary.

The invention is further at least partly based on the insight that energy information of the resonance tank includes in principle all information regarding matching the source and the one or multiple number of electrical loads.

It appears that, by determining an energy amount to be supplied to the tank, based on information of energy in the resonance tank, a more efficient control of energy to the tank and the load can be obtained, thus leading to an energy supply system having an improved performance from an energetic point of view. As a consequence, components and materials used in the chain from the source to the load are optimally used.

According to an embodiment according to the invention, a buffer component of the resonance tank energy is controlled to remain strictly positive, so that the tank always contains enough energy to supply the electrical loads connected to it. As an alternative, the buffer component of the tank energy is allowed to become negative temporarily, thus achieving a very energy efficient scheme. However, energy requirements at the load side are then weakened.

According to a further embodiment according to the invention, a buffer component of the resonance tank energy is minimized in the controlling process, so that an excess of energy in the resonance tank is counteracted, thus providing an energy efficient system.

Further, the invention relates to an adaptive controller.

The invention also relates to a computer program product. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

Other advantageous embodiments according to the invention are described in the following claims.

By way of example only, an embodiment of the present invention will now be described with reference to the accompanying figures in which FIG. 1 shows a schematic perspective view of an electric supply network according to the invention;

The figures are merely schematic views of a preferred embodiment according to the invention. In the figures, the same reference numbers refer to equal or corresponding parts.

Figure 1:
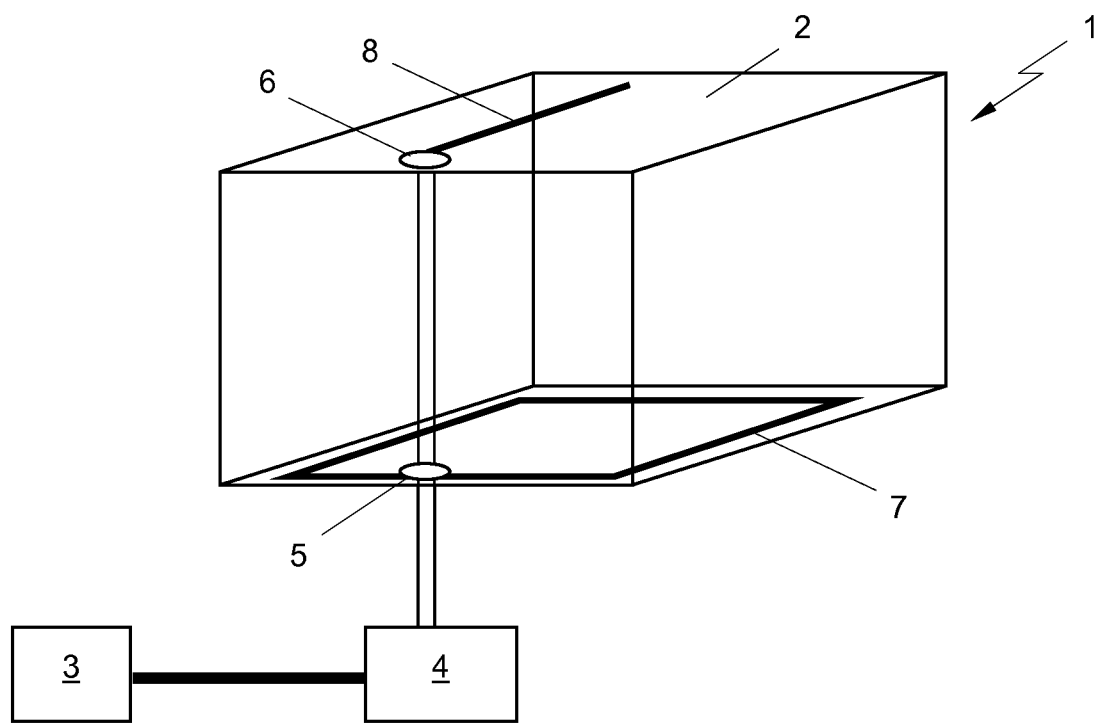

FIG. 1 shows a schematic perspective view of an electric supply network 1 arranged in a rectangular shaped chamber 2. Via a monitoring element 4 the network 1 is connected to a grid point 3 of a public electric power supply system. From the monitoring element 4, a mains line extends towards the chamber 2. The mains line includes distribution points 5, 6 branching off electric supply lines 7, 8 that are located near the floor and the ceiling respectively. Electric loads, such as domestic electrical appliances, can be connected to the electric supply lines 7, 8 in an inductive manner, as explained in more detail below.

Figure 2:
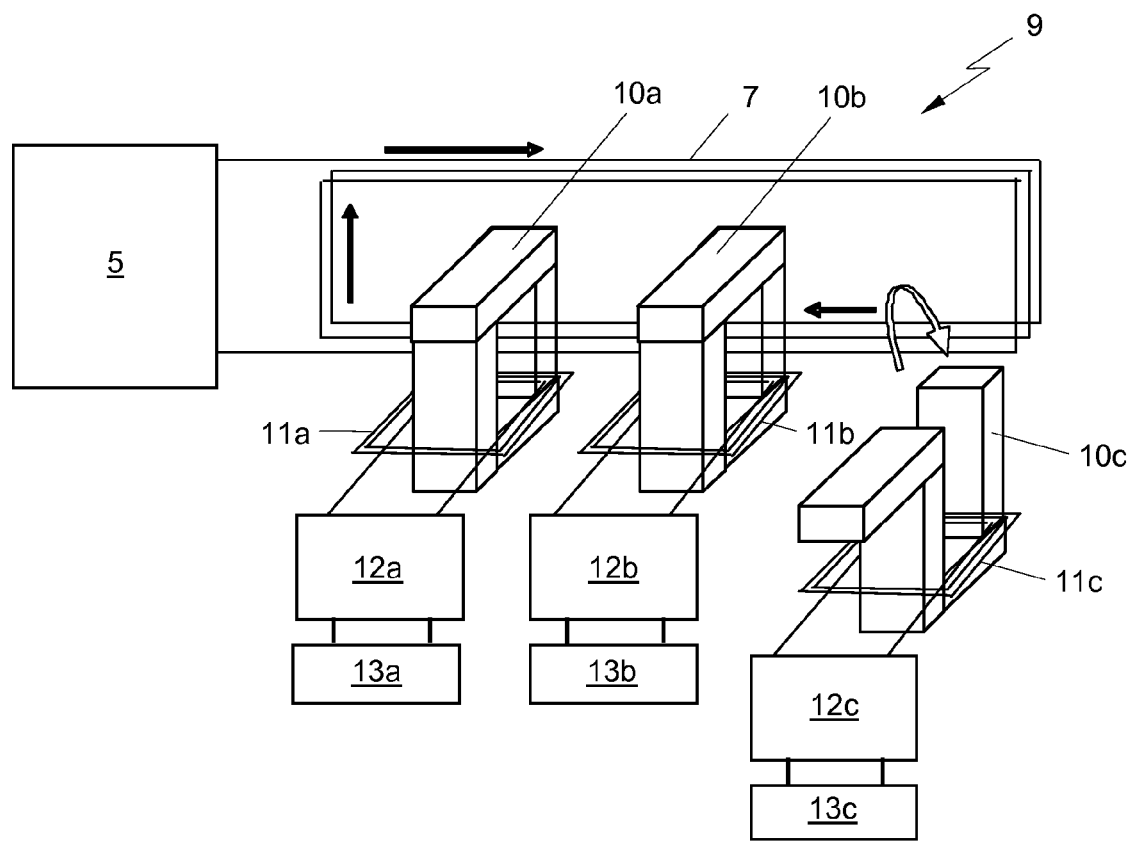
FIG. 2 shows a schematic view of a part of the electric supply network of FIG. 1.

FIG. 2 shows a schematic view of a part 9 of the electric supply network 1. Here, a distribution point 5 is connected to an electric supply line 7 at the floor of the chamber 2. The distribution point 5 includes a capacitor that is arranged in series with the electric supply line 7. The electric supply line 7 is formed as an electrically conducting wire in a closed loop, so that the line 7 and the capacitor form a resonance circuit, also called LC-circuit or resonance tank. The distribution point 5 also includes a converter for converting electrical energy from the electrical source, e.g. a harmonic 50 Hz signal, into electrical energy having a central frequency at the resonance frequency of the resonance tank. The converter comprises an adaptive controller according to the invention for controlling energy supplied by an electrical source, viz, from the grid point 3, to the resonance tank connectable to an electric load.

In order to connect an electrical load to the electric supply line 7, a magnetic ferrite kernel 10a-c can be shifted around a section of the electric supply line 7 that forms a primary coil. Through the opening of the magnetic ferrite kernel 10a-c also a secondary coil 11a-c extends so that a transformer element is formed. The secondary coil 11a-c is connected to an output converter 12a-c for converting the resonance signal to a harmonic signal that is suitable for powering the electrical load 13a-c, viz. a 230 V, 50 Hz signal. Since the electrical load 13a-c is inductively connected, there is no danger for an electrical short cut.

Figure 3:
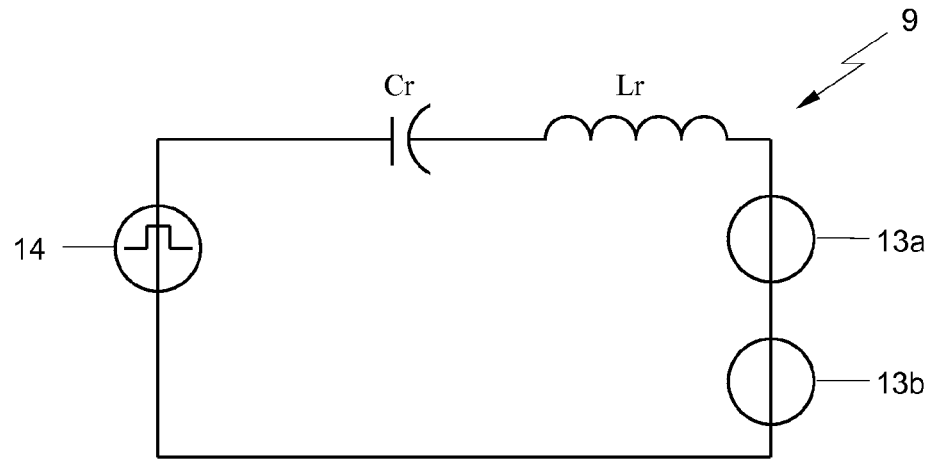
FIG. 3 shows a simple electric scheme of the partial electric supply network of FIG. 2.

FIG. 3 shows a simple electric scheme of the partial electric supply network 9. Here, the resonant power converter including the controller for controlling electrical energy supplied to the resonance tank is represented by a controlled electrical source 14. Further, the capacitor $C_r$, included in the grid point 5, is shown as well as the inductor $L_r$ representing the coil 7. The resonance tank $C_r$, $L_r$ is connected in series with electrical loads 13a-b. Obviously, also another number of electrical loads might be connected to the resonance tank, e.g. a single load or three loads.

Figure 4:
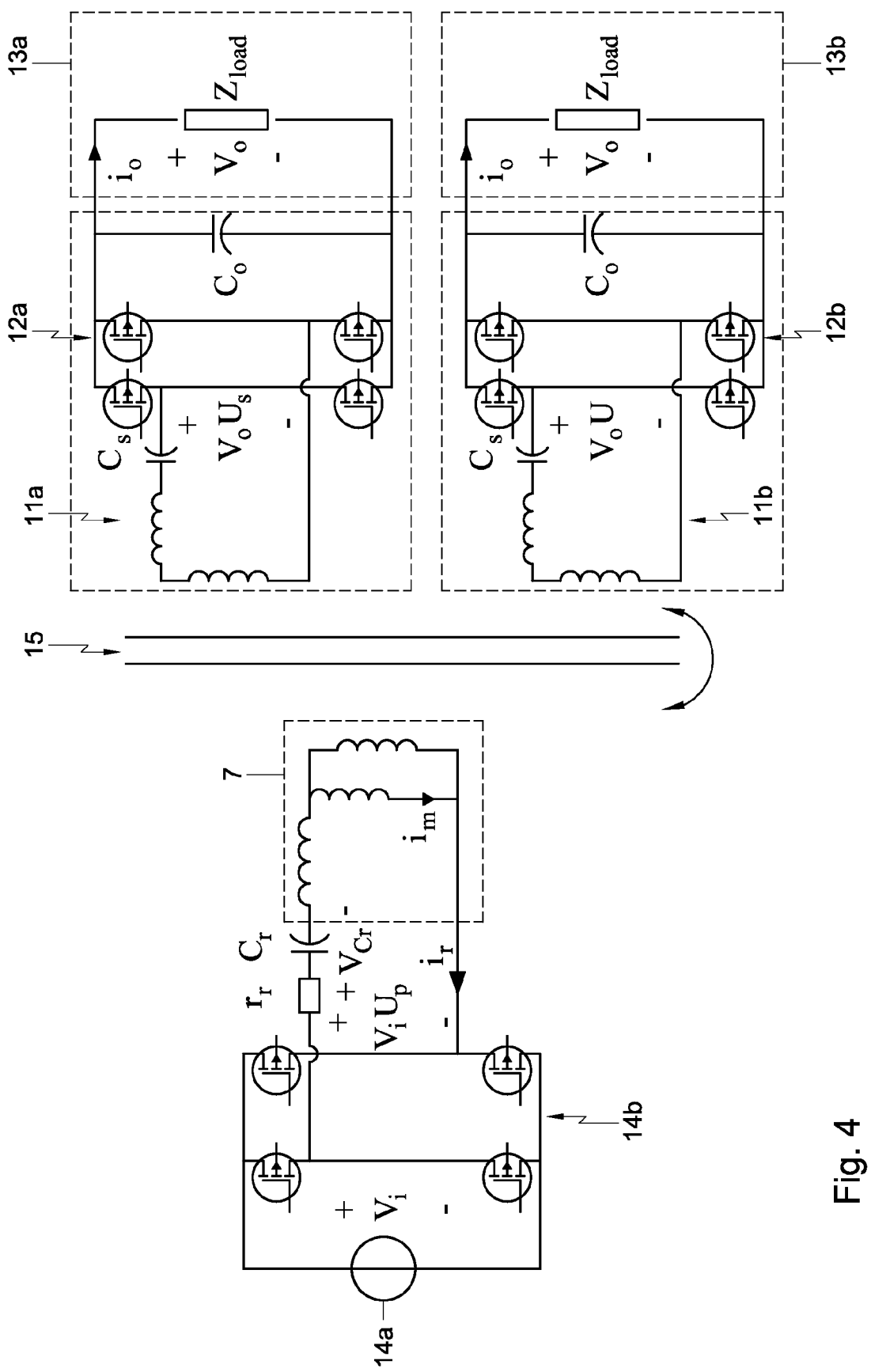
FIG. 4 shows a more detailed electric scheme of the partial electric supply network of FIG. 2.

FIG. 4 shows a more detailed electric scheme of the partial electric supply network 9. The inductance representing the electric supply line is replaced by a more complex inductor circuit 7 while the controlled electrical source 14 is separated in an electrical source 14a and a converter including a switching stage 14b and the controller for controlling the energy supplied to the resonance tank. The switching stage 14b is interconnected between terminals of the electrical source 14a and the resonance tank, respectively. The controller drives switching stage 14b switching elements, e.g. semiconductor switches, preferably high power MOSFET switches. At the load side, the output converter 12a-b includes a switching stage that is controlled to generate a desired electrical signal from the resonance signal in the resonance tank. The secondary coil 11a is inductively connected to the primary coil via a magnetic coupling 15.

Figure 5:
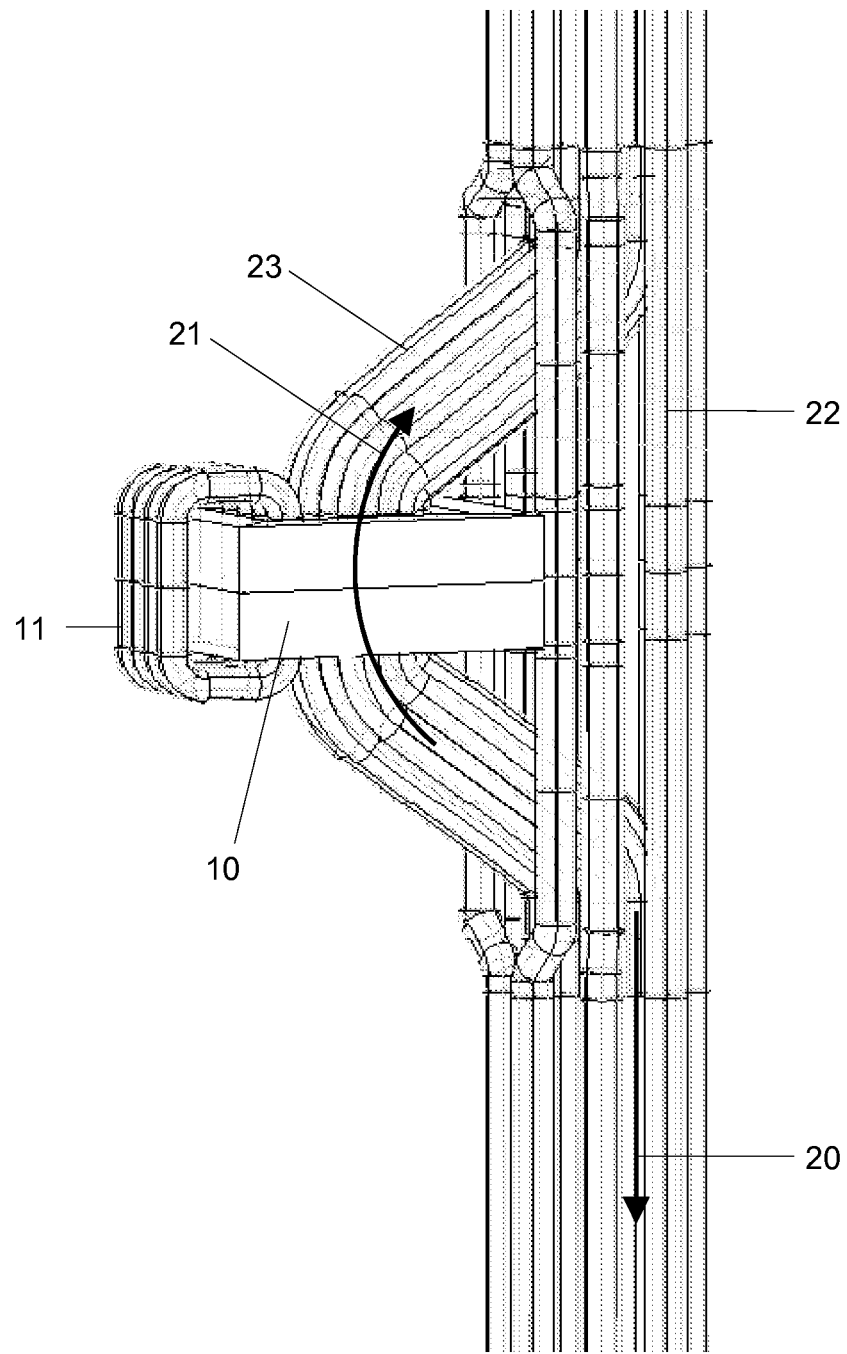
FIG. 5 shows an inductive connection of a load to the electric supply network of FIG. 1.

FIG. 5 shows an exemplary inductive connection of a load to the electric supply network 1. Advantageously, the coil of the electric supply line 7 has an elongated structure such that an offset between electrically conducting elements of the coil is small with respect to the length of said conducting elements, so that magnetic fields by the individual electrically conducting elements mutually substantially cancel. In the shown embodiment in FIG. 5, a first section 22 of the coil including conducting elements wherein, during use, electrical currents flow in a particular direction 20, surround a second section 23 of the coil including conducting elements wherein electrical currents flow in an opposite direction 21. By arranging the coil in such a way, a first section 22 of conducting elements or wires surround a second section 21 of conducting elements or wires, and a net magnetic field outside the electric supply line 7 substantially vanish. Further, the electric supply line 7 can be split, e.g. by using a clamp, at least locally, so that the inner section 21 of conducting elements or wires can be pulled locally out of the surrounding outer section 22 of elements. The magnetic ferrite kernel 10 can than be moved between the first and second section of the primary coil, so that the magnetic field can be coupled to the secondary coil 11.

During operation of the adaptive controller according to the invention, information of energy in the resonance tank is used as a basis for determining an energy amount to be supplied to the resonance tank.

Figure 6:
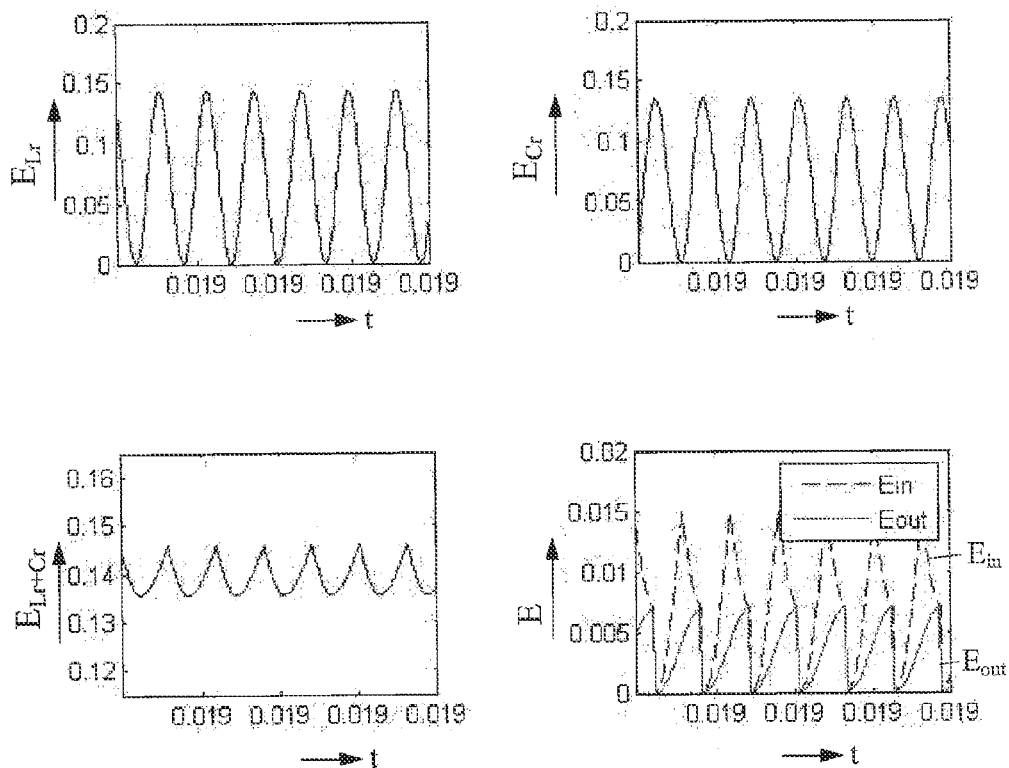
FIG. 6 shows a number of energy plots.

FIG. 6 shows a number of energy plots associated with energy in the resonance tank as a function of time. The upper left plot shows the inductive energy $E_{L_r}$ as a function of time t. Similarly, the upper right plot shows the capacitive energy $E_{C_r}$ as a function of time t. The lower left plot shows the total energy (inductive energy $E_{L_r}$ added to capacitive energy $E_{C_r}$) as a function of time. As expected, the total energy is mainly constant meeting an ideal situation wherein the amount of energy that is input to the resonance tank is equal to the energy that is output to the loads. Due to a disturbance with respect to the ideal situation, a harmonic ripple is present in the total energy. The lower right plot shows the energy $E_{in}$ (dashed line) that is input to the tank and the energy $E_{out}$ (solid line) that is output from the tank.

It is noted that the ripple in the total energy is associated with an instantaneous buffer component of the resonance tank energy. In the process of controlling an amount of energy to be supplied to the tank, the instantaneous buffer component might be set strictly positive while the component is also minimized. Thus, the energy buffer component is used as a basis of information of energy in the resonance tank for the purpose of determining an energy amount to be supplied to the resonance tank.

Advantageously, a filtered increase of resonance tank energy is integrated and subsequently controlled to a value depending on energy supplied to the resonance tank. As an example, said value might be related to the supplied energy in a linear or quadratic way. Depending on a particular application, a proper relation of said value with the supplied energy can be established. Further, the time scale of the filtering process is then different, preferably larger than the time scale of the integrating process, so that a filtered increase of the instantaneous energy buffer component is integrated and related to said value depending on energy supplied to the resonance tank.

Resonance tank energy information can be determined by measuring at least one physical parameter associated with the resonance tank, e.g. an electrical current and/or an electrical voltage.

A control objective, such as relating a filtered increase of resonance tank energy to a value depending on energy supplied to the resonance tank, can be implemented in various ways, e.g. depending on the converter type and switch stage type. As an example, pulse width modulation (PWM), phase-shift modulation (PSM) or frequency modulation (FM) can be employed. Also a combination is possible. As a further example, a quantum conversion (QC) modulation method can be used wherein the modulation is controlled synchronous with the resonance frequency of the resonance tank.

Further, different control algorithms can be applied, both linear and non-linear. As an example, a controller based on sliding-mode control theory is explained in more detail below. In order to arrive at a specific controlling method, one or more control objects have to be rewritten as a valid sliding surface.

A key observation is that the tank transfers energy from one quantum period to the next, although each of the tank components discharges completely during a (quantum) period. Next important observation is the fact that the resonant inductor $L_r$ can not transfer energy between periods, because by definition a consecutive period starts with zero current, and therefore with an energetic empty resonant inductor. The buffer energy is rewritten into (3).

$$\int \overline{\Delta E_{LC}(t)} dt = \overline{E_{buf}} = \int_0^t \left( v_r \cdot i_r + \left[ i_r \cdot L \frac{di_r}{dt} \right] \right) dt = \overline{v_r i_r} \quad (3)$$

The fraction of the input energy, $E_{in}$, that is used for the buffer energy, $E_{buf}$, in the tank is represented by α, according to:

$$\overline{E_{buf}} = \alpha \cdot \overline{E_{in}} \quad (4)$$

The input sliding surface—related to the input converter—then follows in (5) as the difference of equations (3) and (4).

$$S_{input} = \frac{\omega_c}{s+\omega_c} v_r \text{sgn}(i_r) \bar{i}_r - \alpha' \frac{\omega_c}{s+\omega_c} v_{in} \text{sgn}(i_r) \bar{i}_r \quad (5)$$

The purpose of (5) is to become zero, which implies that (5) can be divided by the average of $i_r$.

$$S_{input} = \frac{\omega_c}{s+\omega_c} v_r \text{sgn}(i_r) - \frac{\omega_c}{s+\omega_c} \alpha' \cdot v_{in} \text{sgn}(i_r) \quad (6)$$

While surface (6) is the basic sliding surface, a rewritten form is better suited for mathematical analysis. First step is to rewrite the second right hand term in (6) into (7).

$$v_{in} \text{sgn}(i_r) \equiv V_{in} u_p \quad (7)$$

In (7), the DC input voltage is denoted $V_{in}$ and the control input is denoted by $u_p$. The left term is rewritten by noting that $$\frac{\omega_c}{s+\omega_c} v_r \text{sgn}(i_r) \approx C \cdot \bar{i}_r, \quad (8)$$

where C is a constant dependent on the resonant capacitor value and the angular resonant frequency:

$$C = \frac{2}{\pi} \cdot \omega_c \cdot C_r.$$

The motivation behind the (close) approximation (8) is that applying the low-pass filter on $v_r$ sgn($i_r$) is equivalent to the average of $i_r$ (up to the constant C), when accepting the loss of phase information between voltage and current. Though, one of the strengths of quantum conversion is that phase information is not used at all, because switching occurs only at zero resonant current. If for example the control method would be applied to a different conversion method than quantum conversion (e.g., PWM or FM, see previous paragraph), (8) would not be true.

Substitution of (7) and (8) in sliding surface (6) leads to the rewritten sliding surface (9). Note that phase information is also discarded from the second right hand term by only using the magnitude of the filter.

$$S_p = \bar{i}_r - \alpha' \left| \frac{\omega_c}{s+\omega_c} \right| \frac{u_p}{C_r} V_{in} = \bar{i}_r - \alpha u_p V_{in} \quad (9)$$

Interpreting (9), the first right hand side term represents the buffer energy in the resonant tank when it is multiplied by the resonant current. The second term represents a fraction α of the supplied energy, when also multiplied by the resonant current. Note that both terms originally contained the same resonant current factor $i_r$, which has been left out of the equation, but the energetic origin of the terms is still clear.

The intuitive reason that (9) 'works' is that the supplied energy reacts little more slowly than the buffer tank energy. For example, adopting the common control law (10), it is clear that the buffer will grow faster than the average supplied energy when $S_p>0$ and as a result $S_p$ becomes <0, and vice versa.

$$u_p = \begin{cases} 1, & S_p > 0 \\ 0, & S_p < 0 \end{cases} \quad (10)$$

In the following a formal proof of the validness of (candidate) sliding surface (9) is provided. In sliding-mode control theory the following 3 conditions must be formally met to guarantee stable closed-loop operation: Reaching condition, Existence condition and Stability condition.

Reaching considers the fact that the control law must assure to reach the sliding surface (in finite time) starting from all possible initial states. Existence means that the system dynamics must be able to stay at the sliding surface once it is reached. The stability condition considers internal stability of the closed-loop system. Sliding mode control design effectively linearizes the non-linear plant system, but those invisible reminiscent terms must be checked on stability also.

We start with forming the closed-loop system dynamics with the help of the sliding surfaces. First step is to put $S_p$ equal to zero. Rewriting (9) with $S_p=0$ results in (11).

$$\alpha \omega_c u_p = (s+\omega_c) \bar{i}_r = \frac{d\bar{i}_r}{dt} + \omega_c \bar{i}_r \quad (11)$$

Substituting for $$\frac{d\bar{i}_r}{dt} \text{ in (11)}$$

in the averaged state-space model (i.e., (0a) and (0b)) leads to the following expression for $u_p$ in (12). The terms $u_{sj}$ denote the control variables of the output switching bridges.

$$\bar{u}_p = \frac{\left(r_r - \frac{\pi^2}{4} \omega_c L_r\right) \bar{i}_r + \sum_{j=1}^{m} \frac{v_{ojref}}{n} \bar{u}_{sj}}{v_i - \frac{\pi^2}{4} \omega_c L_r \alpha} \quad (12)$$

Substituting (12) in (0a) leads to a linear first-order differential expression in $\bar{i}_r^2$, which is given in (13).

$$\frac{d\bar{i}_r^2}{dt} = \frac{2\omega_c}{v_i - \frac{\pi^2}{4} \omega_c L_r \alpha} \left( \alpha \sum_{j=1}^{m} \left( \frac{1}{2} C_{oj} \frac{dv_{ojref}^2}{dt} + \frac{v_{ojref}^2}{r_{oj}} \right) - (v_i - r_r \alpha) \bar{i}_r^2 \right) \quad (13)$$

Equation (13) contains the entire dynamics of the closed-loop system. Consulting linear system analysis, stability of the linear system is assured when $$-(v_i - r_r \alpha) < 0 \text{ and } \frac{2\omega_c}{v_i - \frac{\pi^2}{4} \omega_c L_r \alpha} > 0.$$

Rewriting the latter equations leads to the stability condition for α in (14).

$$\alpha < \min\left\{\frac{v_i}{r_r}, \frac{v_i}{\frac{\pi^2}{4}\omega_c L_r}\right\} \quad (14)$$

This shows the upper bound of α for which the system is stable. Result of choosing α larger than the bound in (14) is an unlimited increase of stored energy in the primary circuit. There is no lower bound from a stability point of view, because we look from the primary side (assuming the secondary side dynamics being situated at the sliding surface) and the system will converge to zero-power throughput in the worst case. See FIG. 2 for an illustration.

The existence conditions will put a lower bound for α, in order to assure stable regime; enough input power to supply the secondary sides.

For the outputs the existence conditions are straightforward:

$$-1 < u_{sj} < 1 \rightarrow \bar{i}_r > \max_{j=1\ldots n}\left|C_{oj}\frac{dv_{ojref}}{dt} + i_{oj}\right| \quad (15)$$

Condition (15) simply states that the input current must be larger than load current plus the current through the output filter capacitor.

The input existence condition is the most interesting one. The conditions follow from the fact that the equivalent input control parameter must be between 0 and 1: $0 < u_{p,eq} < 1$. Setting the equivalent input larger than 0 leads to (16).

$$r_r > \frac{\pi^2}{4}\omega_c L_r \quad (16)$$

Note that in (16) the radial frequency is the cut-off frequency of the low-pass filter and not the resonant frequency. Equation (16) reflects the idea that the 'filtered' impedance of the averaged resonant tank must be smaller than the loss resistance in order to have enough real damping. In other words, the resonant tank must be able to release its energy fast enough.

The remaining condition, $u_{p,eq} < 1$, reveals when the buffer-energy percentage in the resonant tank is enough to assure local stability.

Substituting for $u_{p,eq}$ the expression in (12) and rewriting, the final condition follows in (17).

$$\left(v_i + \frac{\pi^2}{4}\omega_c L_r \bar{i}_r\right)\bar{i}_r > \left(r_r \bar{i}_r + \frac{\pi^2}{4}\omega_c L_r \alpha\right)\bar{i}_r + \sum_{j=1}^{m}\frac{1}{2}C_{oj}\frac{dv_{ojref}^2}{dt} + \frac{v_{ojref}^2}{r_{oj}} \quad (17)$$

Expression (17) has the structure of an energy balance. On the right hand side, 'loss' terms are present. To be precise, from left to right: copper loss energy, virtual resonant tank energy, filter capacitor energy and load energy. The 'virtual' energy will be explained shortly. On the left hand side of (17) source terms are present. The left-most term is clearly the averaged input energy, while the right term represents the averaged stored resonant tank energy.

The virtual energy term with α turns out to be a safety measure. It represents the dynamics of the resonant tank in essence. The momentary resonant tank energy can not be viewed as a term completely available (to compensate instantaneously) for the loss energies, because when the tank is empty it must be charged, before it can transfer energy again.

The control parameter α is a function of $\bar{i}_r$ (and vice versa) through the sliding surface and the state-space dynamics. The only problem to advance further into an explicit condition for α is that $\bar{i}_r$ is a function of its own derivative; see (13). The resulting first order differential equation is difficult to solve analytically, due to the non-homogeneous sinusoidal output terms.

The following simplification is justified by the fact that interest is in a (rough) design guidance value for α; in practice the value for α will be tuned by observation.

Returning to expression (13), the simplification consists of assuming zero ripple in $i_r(t)$, which makes the left hand side of (13) equal to 0. Rewriting (13) results in an approximate expression for $\bar{i}_r$ as a function of α:

$$\bar{i}_r \approx \sqrt{\frac{\alpha}{V_i - r_r\alpha}\sum_{j=1}^{m}P_{oj}} \quad (18)$$

In (18), $P_{oj}$ replaces $$\frac{1}{2}C_{oj}\frac{dv_{ojref}^2}{dt} + \frac{v_{ojref}^2}{r_{oj}}.$$

Substitution of (18) in (17) and rearranging terms leads to design condition (19).

$$\left(V_i - \frac{\pi^2}{4}\omega_c L_r\alpha\right)\left(\frac{\alpha}{V_i - r_r\alpha}\sum_{j=1}^{m}P_{oj}\right)^{\frac{1}{2}} > \left(r_r - \frac{\pi^2}{4}\omega_c L_r\right)\left(\frac{\alpha}{V_i - r_r\alpha}\sum_{j=1}^{m}P_{oj}\right) + \sum_{j=1}^{m}P_{oj} \quad (19)$$

In the following the previous design conditions are applied to a design example. Table 1 shows values for the parameters as introduced in FIG. 4.

TABLE I

Parameter values for two-clamp cable prototype as referred to in FIG. 4

| Symbol | QUANTITY | Value |
|---|---|---|
| $V_i$ | input DC voltage | 600 [V] |
| $L_r$ | input side leakage inductance | 40 [uH] |
| $r_r$ | peak value of flux linkage | 2 [Ω] |
| $r_{o1}, r_{o2}$ | output load resistances | 240 [Ω] |
| $\omega_c$ | radial resonant frequency | 100k [Hz] |
| $v_{o1}, v_{o2}$ | required output voltages | 240 [V] |
| $P_{o1}, P_{o2}$ | required output powers | 240 [W] |
| n | number of clamps | 2 |

Stability is assured when (14) applies:

$$\alpha > \min\left\{\frac{600}{2}, \frac{600}{\frac{\pi^2}{4}2\pi \cdot 10^5 \cdot 40 \cdot 10^{-6}}\right\} \approx 9.7$$

The sliding surface for the output exists if (15) holds, where expression (18) is substituted for $\bar{i}_r$:

$$\sqrt{\frac{\alpha}{600-2\alpha}}480 > 1 \rightarrow \alpha > 1.24$$

The input sliding surface exists if (19) holds:

$$\left(600 - \frac{\pi^2}{4} 2\pi \cdot 10^5 \cdot 40 \cdot 10^{-6} \cdot \alpha\right)\left(\frac{480\alpha}{600-2\alpha}\right)^{\frac{1}{2}} >$$
$$\left(2 - \frac{\pi^2}{4} 2\pi \cdot 10^5 \cdot 40 \cdot 10^{-6}\right)\left(\frac{480\alpha}{600-2\alpha}\right) + 480 \rightarrow 0.8 < \alpha < 9.7$$

Combining the previous conditions, the design solution gives:

$$1.24 < \alpha < 9.7 \qquad (20)$$

Whereas α represents the fraction of the input energy that is used for the buffer energy in the tank, the best (i.e., most energy efficient) solution for α is the minimum allowed value in (20).

Figure 7:
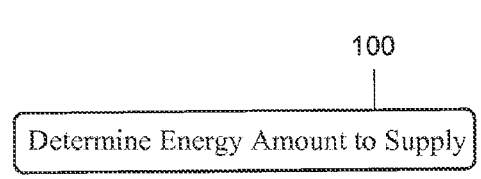
FIG. 7 shows a flow chart of a method according to the invention.

FIG. 7 shows a flow chart of an embodiment of the method according to the invention. An adaptive controlling method is used for controlling energy supplied by an electrical source to a resonance tank connectable to an electric load. The method comprises the step 100 of determining an energy amount to be supplied based on information of energy in the resonance tank.

The adaptive controlling method for controlling energy supplied by an electrical source to a resonance tank connectable to an electric load can be performed using dedicated hardware structures, such as FPGA and/or ASIC components. Otherwise, the method can also at least partially be performed using a computer program product comprising instructions for causing a processor of the computer system to perform the above described one or more steps of the method according to the invention. All steps can in principle be performed on a single processor. However it is noted that at least one step can be performed on a separate processor, e.g. the step of minimizing a buffer component of the resonance tank energy.

The invention is not restricted to the embodiments described herein. It will be understood that many variants are possible.

It is noted that the electric supply network according to the invention might in principle be arranged in building rooms having an arbitrary room geometry, such as in a house or in an office.

It is further noted that the resonance tank can be formed otherwise, e.g. as a capacitor arranged in parallel with the coil of the electric supply line. Further, the electrical loads might be arranged in parallel with the resonance tank.

The resonance tank can not only be implemented as a first order LC-circuit but also as a higher order circuit including more than two reactive elements.

It is also noted that, as an alternative to an inductive connection, one or more electrical loads might be connected to the resonance tank by using an electrically conducting connection without eliminating the operation of the adaptive controller according to the invention.

Other such variants will be obvious for the person skilled in the art and are considered to lie within the scope of the invention as formulated in the following claims.

The invention claimed is:

1. An adaptive controlling method for controlling energy, $E_{in}$, supplied by an electrical source to a resonance tank connectable to an electric load, the method comprising controlling the electrical source to maintain a buffer component of a resonance tank energy of the resonance tank to be proportional to the energy, $E_{in}$, supplied by the electrical source, wherein a fraction α of the energy, $E_{in}$, supplied by the electrical source is used as the buffer component of the resonance tank energy, and wherein α is determined from a highest of lower limits, based on $$\bar{i}_r > \max_{j=1\ldots n} \left| C_{oj} \frac{dv_{ojref}}{dt} + i_{oj} \right|,$$

wherein $$\bar{i}_r \approx \sqrt{\frac{\alpha}{V_i - r_r \alpha} \sum_{j=1}^{m} P_{oj}}$$

with $$P_{oj} = \frac{1}{2} C_{oj} \frac{dv_{ojref}^2}{dt} + \frac{v_{ojref}^2}{r_{oj}},$$

and subject to:

$$\left(V_i - \frac{\pi^2}{4}\omega_c L_r \alpha\right)\left(\frac{\alpha}{V_i - r_r \alpha}\sum_{j=1}^{m} P_{oj}\right)^{\frac{1}{2}} >$$
$$\left(r_r - \frac{\pi^2}{4}\omega_c L_r\right)\left(\frac{\alpha}{V_i - r_r \alpha}\sum_{j=1}^{m} P_{oj}\right) - \sum_{j=1}^{m} P_{oj}$$

wherein $i_r$ represents an input resonance current, $V_i$ represents input DC voltage, $L_r$ represents input side leakage inductance, $r_r$ represents primary side winding resistance, $r_{oj}$ output load resistance for load j, $\omega_c$ represents angular resonant frequency, $v_{ojref}$ represents required output voltage for load j, $P_{oj}$ represents required output power for load j, m represents a number of loads, n represents number of clamps for connection of loads, $C_{oj}$ represents capacitance of output filter j parallel to load j, and $i_{oj}$ represents current through load j.

2. A method according to claim 1, wherein the upper limit of α is constrained by $$\alpha < \min\left\{\frac{V_i}{r_r}, \frac{V_i}{\frac{\pi^2}{4}\omega_c L_r}\right\}.$$

3. A method according to claim 1, wherein the buffer component of the resonance tank energy is maintained to remain strictly positive.

4. A method according to claim 1, wherein the buffer component of the resonance tank energy is minimized during the controlling step wherein $v_i$ represents the input DC voltage.

5. A method according to claim 1, further comprising filtering and integrating an increase of resonance tank energy to obtain a filtered increase in resonance energy, and subsequently controlling the filtered increase in resonance energy to a value depending on the energy supplied by the electrical source, wherein time scales of filtering and integrating are different.

6. A method according to claim 5, wherein the value depending on the supplied energy is related thereto in a linear or quadratic way.

7. A method according to claim 5, wherein the filtered increase in resonance energy is controlled using a pulse width modulation (PWM), a phase-shift modulation (PSM), a frequency modulation (FM) and/or a quantum conversion (QC) modulation.

8. A method according to claim 5, wherein the filtered increase in resonance energy is controlled based on sliding-mode control theory.

9. A method according to claim 1, further comprising measuring at least one physical parameter for determining resonance tank energy information.

10. An adaptive controller for controlling energy, $E_{in}$, supplied by an electrical source to a resonance tank connectable to an electric load, wherein the controller is configured to control the electrical source to maintain a buffer component of a resonance tank energy of the resonance tank to be proportional to the energy, $E_{in}$, supplied by the electrical source, wherein a fraction $\alpha$ of the energy, $E_{in}$, supplied by the electrical source is used as the buffer component of the resonance tank energy, and wherein $\alpha$ is determined from a highest of lower limits, based on $$\bar{i}_r > \max_{j=1...n} \left| C_{oj} \frac{dv_{ojref}}{dt} + i_{oj} \right|,$$

wherein $$\bar{i}_r \approx \sqrt{\frac{\alpha}{V_i - r_r \alpha} \sum_{j=1}^{m} P_{oj}}$$

with $$P_{oj} = \frac{1}{2} C_{oj} \frac{dv_{ojref}^2}{dt} + \frac{v_{ojref}^2}{r_{oj}},$$

and subject to:

$$\left(V_i - \frac{\pi^2}{4} \omega_c L_r \alpha\right)\left(\frac{\alpha}{V_i - r_r \alpha} \sum_{j=1}^{m} P_{oj}\right)^{\frac{1}{2}} >$$

$$\left(r_r - \frac{\pi^2}{4} \omega_c L_r\right)\left(\frac{\alpha}{V_i - r_r \alpha} \sum_{j=1}^{m} P_{oj}\right) - \sum_{j=1}^{m} P_{oj}$$

wherein $i_r$ represents an input resonance current, $V_j$ represents input DC voltage, $L_r$ represents input side leakage inductance, $r_r$ represents primary side winding resistance, $r_{oj}$ output load resistance for load j, $\omega_c$ represents angular resonant frequency, $v_{ojref}$ represents required output voltage for load j, $P_{oj}$ represents required output power for load j, m represents a number of loads, n represents number of clamps for connection of loads, $C_{oj}$ represents capacitance of output filter j parallel to load j, and $i_{oj}$ represents current through load j.

11. An adaptive controller according to claim 10, wherein the controller is arranged for driving a switching stage interconnected between terminals of the electrical source and the resonance tank, respectively.

12. An electric supply network, including an adaptive controller according to claim 11, and the resonance tank connected thereto.

13. An electric supply network according to claim 12, wherein the resonance tank comprises an LC-circuit, and wherein a coil of the LC-circuit is inductively connectable to the electric load.

14. An electric supply network according to claim 13, wherein the coil is inductively connectable to a multiple number of electric loads.

15. An electric supply network according to claim 13, wherein the coil has an elongated structure such that an offset between electrically conducting elements of the coil with respect to the length of said conducting elements is such that magnetic fields by the electrically conducting elements mutually substantially cancel.

16. A non-transitory computer readable medium having a computer program embodied thereon, the computer program for controlling energy supplied by an electrical source to a resonance tank connectable to an electric load, the computer program including instructions for a programmable processor that, when executed by the programmable processor, causes the programmable processor to control the electrical source to maintain a buffer component of a resonance tank energy of the resonance tank to be proportional to the energy, $E_{in}$, supplied by the electrical source, wherein a fraction $\alpha$ of the energy, $E_{in}$, supplied by the electrical source is used as the buffer component of the resonance tank energy, and wherein $\alpha$ is determined from a highest of lower limits, based on $$\bar{i}_r > \max_{j=1...n} \left| C_{oj} \frac{dv_{ojref}}{dt} + i_{oj} \right|,$$

wherein $$\bar{i}_r \approx \sqrt{\frac{\alpha}{V_i - r_r \alpha} \sum_{j=1}^{m} P_{oj}}$$

with $$P_{oj} = \frac{1}{2} C_{oj} \frac{dv_{ojref}^2}{dt} + \frac{v_{ojref}^2}{r_{oj}},$$

and subject to:

$$\left(V_i - \frac{\pi^2}{4} \omega_c L_r \alpha\right)\left(\frac{\alpha}{V_i - r_r \alpha} \sum_{j=1}^{m} P_{oj}\right)^{\frac{1}{2}} >$$

$$\left(r_r - \frac{\pi^2}{4} \omega_c L_r\right)\left(\frac{\alpha}{V_i - r_r \alpha} \sum_{j=1}^{m} P_{oj}\right) - \sum_{j=1}^{m} P_{oj}$$

wherein $i_r$ represents an input resonance current, $V_j$ represents input DC voltage, $L_r$ represents input side leakage inductance, $r_r$ represents primary side winding resistance, $r_{oj}$ output load resistance for load j, $\omega_c$ represents angular resonant frequency, $v_{ojref}$ represents required output voltage for load j, $P_{oj}$ represents required output power for load j, m represents a number of loads, n represents number of clamps for connection of loads, $C_{oj}$ represents capacitance of output filter j parallel to load j, and $i_{oj}$ represents current through load j.

* * * * *